Figure 1:
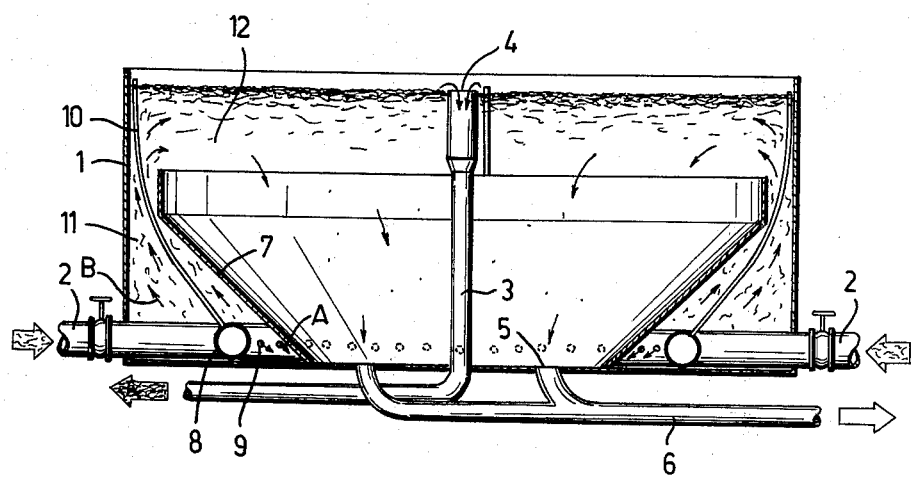

United States Patent [19]

Sammatti

[11] 4,220,532
[45] Sep. 2, 1980

[54] FLOTATION PURIFICATION APPARATUS

[75] Inventor: Pekka T. Sammatti, Nokia, Finland

[73] Assignee: Oy Nokia AB, Helsinki, Finland

[21] Appl. No.: 880,724

[22] Filed: Feb. 24, 1978

[30] Foreign Application Priority Data

Feb. 25, 1977 [FI] Finland .................................. 770618

[51] Int. Cl.² .............................................. B03D 1/00
[52] U.S. Cl. ............................................... 210/221 R
[58] Field of Search .................. 210/221 R, 221 P, 44

[56] References Cited

U.S. PATENT DOCUMENTS 2,695,710  11/1954  Gibbs .................................. 210/221 P
3,307,701  3/1967   Krofta ................................. 210/221 P Primary Examiner—Thomas G. Wyse
Attorney, Agent, or Firm—Finnegan, Henderson, Farabow, Garrett & Dunner

[57] ABSTRACT

A flotation purification apparatus for separating solids from solids-containing liquids. The apparatus comprises a flotation tank, an annular distributing channel positioned in said tank for supplying the liquid to be purified into said tank and an upwardly widening partition wall positioned in said tank and separating the distributing chamber from outlets for the solids and the purified liquid respectively. The distributing channel is provided with outlets directed toward the corner between the bottom of said tank and said partition wall.

4 Claims, 2 Drawing Figures

FLOTATION PURIFICATION APPARATUS

This invention relates to a purification apparatus for separating solids by means of flotation from solids-containing liquids, comprising a flotation tank, at least one inlet for the liquid to be purified and outlets for separated solids and purified liquid, respectively, as well as an annular distributing channel located in the flotation tank and connected to said inlet, said distributing channel being provided with a plurality of outlets for the liquid to be purified, and an upwardly widening partition wall located in the flotation tank and separating said inlet from said outlets.

For the purification of solids-containing liquids, such as fines-containing waters from paper machines, it is previously well-known to use the so called flotation method according to which the solids are by means of flocculating chemicals and finely divided air bubbles agglomerated to form flocks rising to the liquid surface, from which they can be removed from the flotation tank.

Several different constructions of flotation purification apparatuses are previously known. In these, the liquid to be purified is fed tangentially, centrally or radially into the flotation tank. It has been found that keeping the liquid to be purified in a laminar motion promotes the flocculation of the solids and that a too strong rotary motion in the tank may cause flocks to pass in the wrong direction and cause disintegration of flocks already formed as well as interfere with the surface flock layer. Because the rotary motion usually is produced by the incoming liquid to be purified, the feeding rate of the liquid must be kept correspondingly relatively low, which prevents the increasing of the productivity of the apparatus.

It is an object of the present invention to provide a purification apparatus which eliminates the above mentioned disadvantages, and this object is achieved by means of an apparatus according to the invention, which is characterized in that the outlets of the distributing channel are directed toward the corner between the bottom of the flotation tank and the partition wall.

According to the invention, there is provided a compact and efficient purification apparatus of a simple construction. Due to the fact that the partial flows discharged by the distributing channel are directed into the corner between the bottom of the tank and the partition wall, the cinetic energy of the partial flows is consumed when they collide with the corner and their direction is changed into the opposite as the liquid starts to flow through the retarding zone into the separation zone. In this way it is possible to supply the liquid to be purified into the tank in considerably larger amounts per time unit without a risk that the numerous partial flows cause only disadvantageous unitary turbulence and circulation in the tank. In spite of the larger amounts of supplied liquid, the liquid has a possibility to retard sufficiently undisturbed before entering the actual separating zone. By using such a way of supplying the liquid into the tank the purification capacity of the apparatus is substantially uninfluenced by variations in the supply rate of the liquid to be purified.

Figure 2:
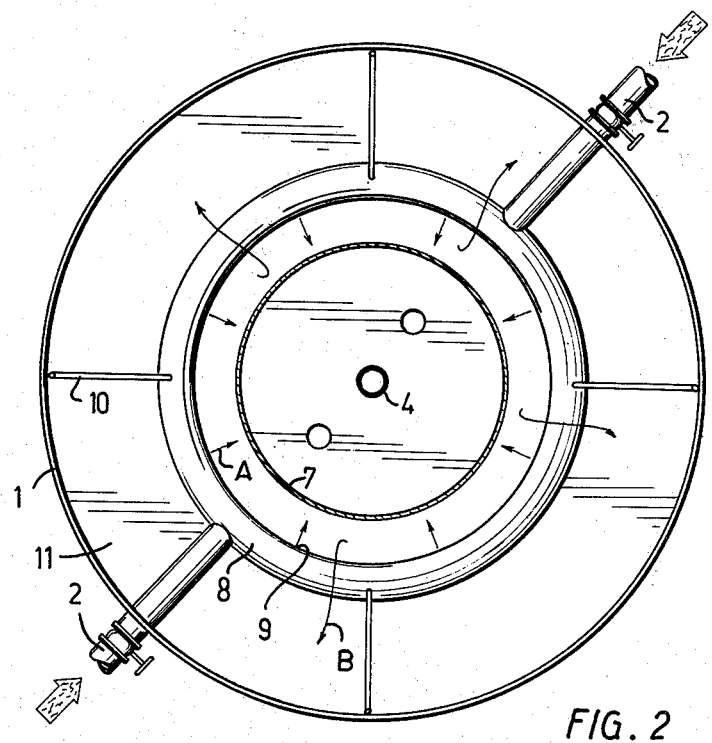

The invention will be described in more detail in the following with reference to the accompanying drawing, where, FIG. 1 and 2 schematically show one embodiment of and flotation purification apparatus according to the invention in axial section and as a top view, respectively.

The purification apparatus shown in FIG. 1 and 2 of the drawing comprises a cylindrical flotation tank 1 with two inlet pipes 2 for the solids-containing liquid to be purified, said pipes extending from diametrally opposite sides into the tank. In connection with a feed pump, which pumps the liquid to be purified into the tank, air is dissolved in the liquid. Flocculating chemicals may also be added, if necessary.

In the middle of the flotation tank, there is arranged a vertical outlet pipe 3 for discharging solids separated from the liquid. The outlet opening 4 of this pipe is located at the desired liquid level in the tank.

A plurality of spaced outlets 5 for the clarified liquid are provided in the bottom of the flotation tank and are connected to a common discharge pipe 6.

In the flotation tank, there is, moreover, mounted an upwardly conically widening partition wall 7 for separating the inlet pipes 2 from direct communication with the outlets 5 for the purified liquid.

According to the invention, the inlet pipes 2 are connected to a distributing channel 8 mounted at the bottom of the flotation tank and consisting of a circular ring shaped pipe provided with a plurality of discharge openings 9 for the liquid to the purified equidistantly spaced along its inner periphery. These openings point toward the corner between the bottom of the tank and the partition wall. The pipe is provided with equidistantly spaced upwardly extending pipes 10.

The apparatus operates as follows: The liquid to be purified which is fed through the inlet pipes 2 into the distributing channel 8 is discharged through its openings 9 in partial flows directed toward the corner between the bottom of the tank and the partition wall, as shown by arrows A. The partial flows hit against the partition wall and bottom, thereby changing their direction into the opposite toward the retarding zone 11 and the separation zone 12, as shown by arrows B. In the retarding zone, the solids contained by the liquid start to flocculate under the promoting action of flocculating chemicals. Air dissolved into the liquid is after the pressure reduction occuring when the liquid is fed into the tank discharged as fine air bubbles which adhere to the flocks and cause themmto rise in the tank. Tha flock layer formed on the surface is successively discharged through the outlet opening 4 into the discharge pipe and the liquid free of solids in the lower part of the tank is discharged through the outlets 5. Any big air bubbles within the distributing channel are allowed to dischange from the pipe through the pipes 10 extending upwardly above the surface of the tank so that they do not break the flocks and cause disturbing flows.

It will be noted that the liquid to be cleaned can, due to the distributing channel, be divided into a plurality of partial flows which are discharged into the tank evenly across the tank. The kinetic energy of the partial flows will be absorbed by the collision of the partial flows with the corner of the tank bottom and partition wall and by the change of direction of the partial flows.

The drawing and the appended specification are only intended to illustrate the idea of the invention. In its details, the apparatus according to the invention may vary considerably within the scope of the claims. Thus, the annular distributing channel may instead of a continuous ring consist of two or more partial rings each connected to inlet pipes of their own. Instead of a shape exactly corresponding to a circular ring, the distributing channel may be polygonal in shape.

What I claim is:

1. A purification apparatus for separation of solids from solids containing liquids comprising a flotation tank having outlet means for separated solids and outlet means for pruified liquid, an upwardly widening partition wall extending upwardly from the bottom of said tank and forming a retardation chamber within said tank, the outer surface of said partition wall forming an acute angle with said tank bottom, a distributing channel surrounding said partition wall and having outlet openings facing the juncture between said partition wall and said tank bottom, inlet means for said solids containing liquid conducting said solids containing liquid directly to said distributing channel, the solids containing liquid emerging from said channel outlets being directed toward the acute angular corner between said partition wall and said tank bottom.

2. A purification apparatus as claimed in claim 1, said flotation tank being cylindrical, said partition wall being angular and widening conically upwardly from the bottom of said tank and located centrally therein, said distributing channel being positioned on the bottom of said tank.

3. A purification apparatus as claimed in claim 1 or 2, said distributing channel comprising a circular ring-shaped pipe surrounding said partition wall.

4. A purification apparatus as claimed in claim 3, the outlets of said distributing channel being formed by holes equidistantly spaced along the inner periphery of said channel and being distributed over the entire length of said distributing channel.